Jan. 8, 1924. 1,480,250
W. EHRLICH
PIE MARKER
Filed Jan. 20, 1922 3 Sheets-Sheet 1

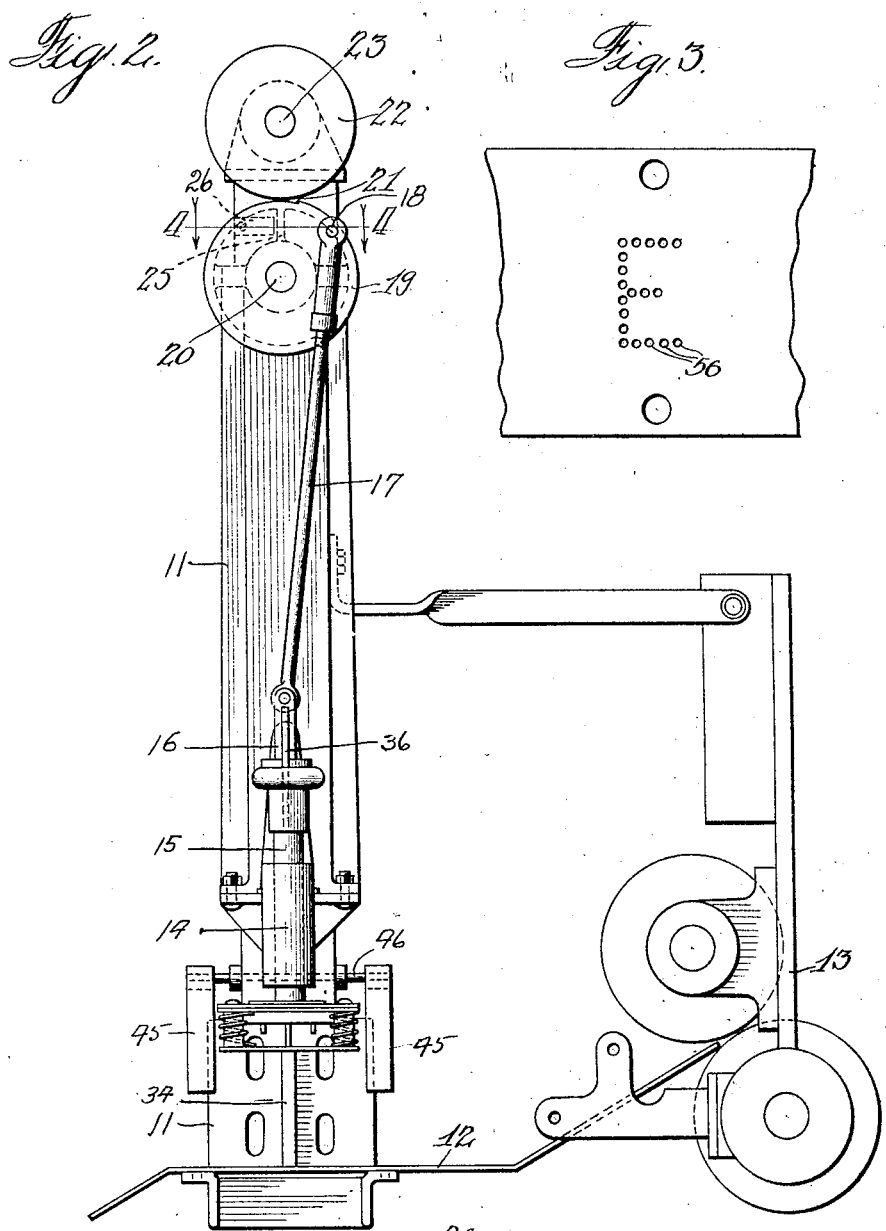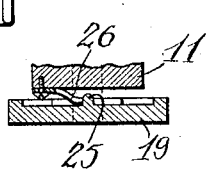

Jan. 8, 1924.
W. EHRLICH
PIE MARKER
Filed Jan. 20, 1922 3 Sheets-Sheet 3
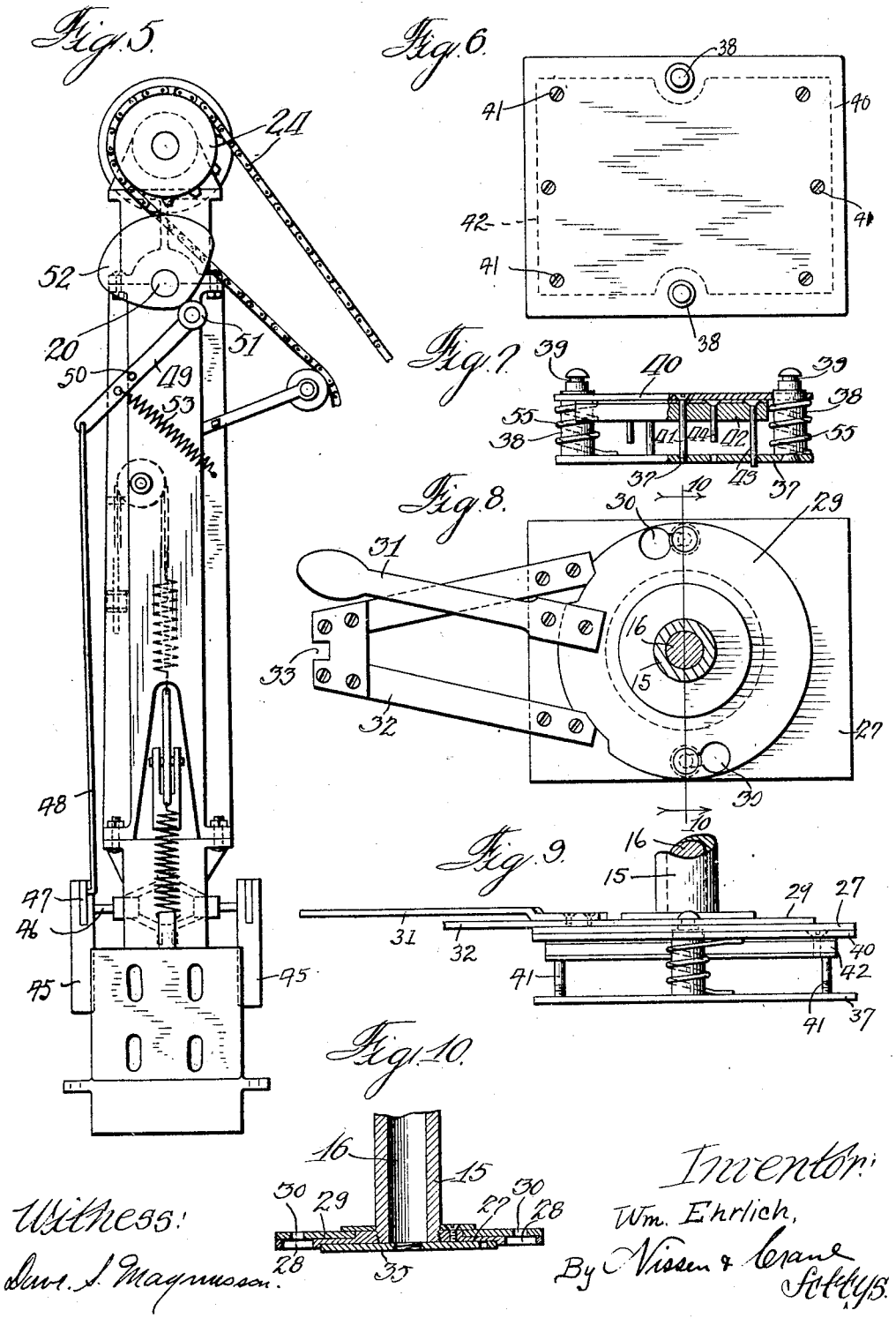

Patented Jan. 8, 1924.

1,480,250

UNITED STATES PATENT OFFICE.

WILLIAM EHRLICH, OF CHICAGO, ILLINOIS, ASSIGNOR TO CASE & MARTIN COMPANY, OF CHICAGO, ILLINOIS, A CORPORATION OF ILLINOIS.

PIE MARKER.

Application filed January 20, 1922. Serial No. 530,583.

*To all whom it may concern:*

Be it known that I, WILLIAM EHRLICH, a citizen of the United States, residing at Chicago, in the county of Cook and State of Illinois, have invented certain new and useful Improvements in Pie Markers, of which the following is a specification.

My invention relates to pie markers and has for one of its objects the provision of a simple and efficient device of this character for marking the crusts of pies to denote the kind of pie.

A further object is the provision of a simple and efficient device for marking pies to indicate their kind and at the same time to perforate the upper crust for permitting the steam to pass out during baking.

A further object is the provision of a device of the character mentioned which is power driven, but started by hand power.

A still further object is the provision of a device of the character mentioned which will effectively mark pies and free itself from the pie dough without mutilating the latter.

Other objects will appear hereinafter.

An embodiment of my invention is illustrated in the accompanying drawings, forming a part of this specification, and in which—

Fig. 1 is a side view of the device embodying my invention;

Fig. 2 is a front view of the same;

Fig. 3 is a top view of a die plate used in the construction;

Fig. 4 is a fragmental section taken on line 4—4 of Fig. 2;

Fig. 5 is a rear view of the device shown in Fig. 2;

Fig. 6 is an enlarged top view of the punch-element of the device;

Fig. 7 is an end view of the same with a portion broken away to show underlying parts;

Fig. 8 is an enlarged fragmental section taken on line 8—8 of Fig. 1;

Fig. 9 is a side view of the parts shown in Fig. 8; and

Fig. 10 is an enlarged fragmental section taken on line 10—10 of Fig. 8.

Referring more particularly to the drawings, I have indicated a frame 11 adapted to be secured to any desirable support, not shown. The frame 11 is arranged in any desirable manner to accommodate the parts hereinafter mentioned.

On the frame 11 I have indicated a base 12 over which the pie dough is conveyed from the rolling device 13 indicated in Fig. 2. The mechanism 13 for rolling out the dough may be of any preferred design.

In a vertical bearing 14 of the frame 11 is mounted a sleeve 15 in which a plunger 16 is slidably mounted. The plunger 16 is connected by a connecting link 17 with a crank 18 on a driven gear 19. The gear 19 is fixed on a shaft 20 which is journaled in suitable bearings in frame 11 on a horizontal axis.

The gear 19 is preferably provided with a cut-away portion 21 in a proper position. The gear 19 is driven by a driving gear 22 fixed on a shaft 23 also journaled in frame 11. The shaft 23 may be driven through a belt and pulley 24, or in any desirable manner. The shaft 23 and pulley 24 are adapted to be continuously rotated and the notch 21 arranged in a suitable portion of the gear 19 so that gears 19 and 22 are disconnected when the marking die is substantially at its upper terminal of movement.

In order to prevent backward turning of shaft 20 a stop 25 may be provided on the rear side of gear 19 in a position to be engaged by a spring 26, or its equivalent, mounted on frame 11, see Figs. 2 and 4. When the gears 19 and 22 are disengaged, spring 26 will slide over the stop 25 and hold the gear 19 against backward movement.

On the lower end of sleeve 15 is a head 27 which has two openings 28 therein and on the upper side of said head 27 is a plate 29 which has two key hole slots 30 therein. The plate 29 is mounted for limited rotation and is moved by a hand lever 31 fixed to said plate. The head 27 also has an arm 32 which has a notch 33 therein engaging a guide 34 on frame 11 to hold the head 27 against rotary movement on the axis of sleeve 15.

The plunger 16 has a head 35 fixed on its lower end and the latter is capable of movement downwardly away from head 27. The head 35 and plunger 16 are held against rotary movement by a lever 36 passing through a suitable slot in the upper end of said plunger, as clearly indicated in Figs. 1 and 2.

A punch member is arranged on the lower end of the sleeve 15 and removably secured to the head 27. The punch member consists of a plate 37 which has two upstanding posts 38 thereon, and the posts have restricted portions 39 adapted to pass through openings 28 and 30 to hold the punch member in position. With the arrangement shown, handle 31 is moved to rotate plate 29 until the enlarged parts of openings 30 register with the openings 28, and then upon rotating the handle 31 back to its position indicated in Fig. 8 after the restricted portions 39 have been placed in said openings, the punch member will be locked to the head 27.

Above the plate 37 is a plate 40 and the latter is adapted to rest against head 35 on plunger 16. Screws 41 pass through the plate 40 and are threaded in the plate 37 to limit the separating movement of plates 37 and 40. On the under side of plate 40 is a punch-holding member 42 having punches 43 and 44 therein. The plate 37 has openings therein adapted for the passage of punches 43 and 44. The punches 43 are preferably long enough to always be in their openings in plate 37. The punches 44 are preferably shorter and pass out of their openings in plate 37, as clearly indicated in Fig. 7. With this arrangement, when the device is operated the punches 43 will pass through the pie dough making holes for the passage of steam out of the pie during baking. The length of the punches 44 is such that they will pass through plate 37 and make indentations in the pie crust, but not pass entirely through the latter. It will be apparent that as many of the punches 43 and 44 may be provided as desired, and arranged to make any desired kind of marking on the pie.

Stripping fingers 45 are fixed on a shaft 46 mounted in frame 11 and arranged so that a finger 45 is on each side of the punch member. One of the fingers 45 has an arm 47 reaching beyond the shaft 46 and said arm 47 is connected by a link 48 with a lever 49 which is pivoted as at 50 to the frame 11. The lever 49 also has a roller 51 mounted thereon which engages a cam 52 on shaft 20. The cam 52 is cut so that the fingers 45 will be forced down onto the pie dough passing at the sides of the punch member and remain in engagement with the pie dough until after the punch member has been engaged with and withdrawn from the pie dough. A spring 53 serves to hold the roller 51 against the cam 52 and the fingers normally away from plate 12.

In operation, the shaft 23 and gear 22 are continuously rotated. When it is desired to mark a pie, dough is moved along plate 12 under the punches and the operator grasping handle 54 on lever 36 pulls downwardly on said handle. This rotates shaft 20 around until the mutilated part 21 of the gear 19 moves away from gear 22 when the latter engages said gear 19, completing the rotation of said gear 19 and causing the operation of the punches. Upon the downward movement of the punch member, plate 37 will engage the pie dough before the end of the stroke of the crank 18. The completion of the downward stroke of said crank forces the head 35 against plate 40 and this movement moves the punches 43 and 44 into operative engagement with the pie crust. Upon the crank 18 starting on its upward stroke the punches 43 and 44 are withdrawn from the pie crust by springs 55 around posts 38 and between plates 37 and 40. Upon continued upward movement of the crank 18, plate 37 will be moved away from the pie crust, and after said plate 37 has moved out of engagement with the pie crust the fingers 45 will be raised, permitting the pie crust to be removed from the device. It will be apparent that the plate 12 will be provided with die openings 56 for the reception of punches 43 to puncture the pie crust. These openings 56 will correspond in number and arrangement with the size and arrangement of said punches 43.

I claim:—

1. A pie marker comprising a plunger; a marking die attached to said plunger; a driving gear; a mutilated gear having its multilated part normally adjacent the driving gear; a connection between the mutilated gear and said plunger; and manually operable means attached to said plunger for moving said multilated gear into engagement with said driving gear.

2. A pie marker comprising a marking die; a shaft; an operable connection between the shaft and pie marking die; power driving means normally disconnected from said shaft; and manual means connected with said connection and adapted to initially rotate the shaft to effect a connection of the power driving means with said shaft.

3. A pie marker comprising a frame having two parallel shafts therein; gears on said shafts with a mutilation in one of said gears for disconnecting the latter; pie-marking means connected with one of said gears; and manually operable means for moving said gears relatively to bring them into engagement with each other.

4. A pie marker comprising a plunger; a sleeve mounted on said plunger, a punch-holding frame mounted on said sleeve; and a plurality of punches mounted in said punch-holding frame and operatively connected with said plunger.

5. A pie marker comprising a sleeve slidably mounted; a frame attached to said sleeve; a punch-holding member movably mounted in said frame; means limiting the movement of said punch-holding member in said frame; springs tending to hold said punch-holding member in a given relation to said frame; and a plunger mounted in said sleeve and engaging said punch-holding member for moving the latter relatively to said frame.

6. A pie marker comprising a shaft; pie-marking means reciprocally mounted and connected with said shaft; and stripping fingers disposed adjacent opposite sides of said pie-marking means and connected with said shaft, said stripping fingers being adapted to hold a pie crust until after the pie-marking means has been disconnected from said pie crust.

7. A pie-marking device comprising a punch plate; two sets of parallel punches rigidly fixed on said punch plate and means for operating said punches to force one set of said punches through a pie crust and force the other set of punches into engagement with a pie crust without passing through the latter.

8. A pie marking device comprising a punch plate; a perforated plate; two sets of parallel punches with one set of said punches longer than the other set and both of said sets of punches fixed on said plate, the longer set of punches being permanently in engagement with certain of the perforations of said perforated plate and the shorter punches being normally out of said perforated plate; and means for moving said punch plate toward said perforated plate and sliding said longer punches in their respective perforations and moving the free ends of said shorter punches through said perforated plate.

9. A pie marker comprising a sleeve; a frame attached to the bottom of said sleeve; a plunger slidably mounted in said sleeve; a punch-holding member mounted in said frame and engaging said plunger; and power mechanism attached to said plunger for sliding the latter in said sleeve and moving said punches in said frame.

10. A pie-marking device comprising a crank shaft; a plunger connected with said crank shaft and having an opening therethrough; pie-marking means connected with the bottom of said plunger; a lever extending through the opening in said plunger and adapted for imparting initial movement to said plunger; and power means connected with said crank for operating the latter after said initial movement.

11. A pie-marking device comprising a frame having two substantially parallel shafts journaled therein; a friction gear on one of said shafts; a friction gear on the other of said shafts having a notch therein normally adjacent the first-mentioned gear; a lock for locking the second-mentioned gear against backward rotation; and manually operable means for rotating the second-mentioned gear to engagement with the first-mentioned gear.

12. A pie marker comprising a driving gear adapted for continuous rotation; a driven gear having a mutilation in one side which is normally adjacent the driving gear; a lock for locking the driven gear in said position; a crank pin on the driven gear in a portion adjacent the driving gear; a plunger connected with said crank; and pie-marking means at the end of said plunger opposite said gears.

13. A pie-marking device comprising a shaft; a driven gear on said shaft having a shoulder thereon; a spring mounted in a fixed position adapted to engage said shoulder for holding said gear against backward rotation; a driving gear mounted in operative relation with the first-mentioned gear; and pie-marking means connected with the first mentioned gear.

14. A pie-marking device comprising a frame having a die plate thereon; a plunger mounted for reciprocating movements toward and away from the die plate; operating means connected with said plunger; and pie-marking punches mounted on said plunger and adapted to cooperate with said die, certain of said punches being adapted to enter said die to perforate a pie crust and other of said punches being adapted to indent said pie crust without piercing the latter.

In testimony whereof I have signed my name to this specification on this 11th day of January, A. D. 1922.

WILLIAM EHRLICH.